(12) United States Patent
Roopnarine

(10) Patent No.: US 8,581,452 B2
(45) Date of Patent: Nov. 12, 2013

(54) MOTOR FOR HIGH TEMPERATURE APPLICATIONS

(75) Inventor: Roopnarine, New York, NY (US)

(73) Assignee: Honeybee Robotics Ltd., New York, NY (US)

(*) Notice: Subject to any disclaimer, the term of this patent is extended or adjusted under 35 U.S.C. 154(b) by 187 days.

(21) Appl. No.: 13/190,647

(22) Filed: Jul. 26, 2011

(65) Prior Publication Data

US 2012/0025636 A1   Feb. 2, 2012

Related U.S. Application Data

(63) Continuation-in-part of application No. 12/255,465, filed on Oct. 21, 2008, now abandoned.

(60) Provisional application No. 60/981,726, filed on Oct. 22, 2007.

(51) Int. Cl.
*H02K 5/10* (2006.01)

(52) U.S. Cl.
USPC .............................................. 310/45; 310/86

(58) Field of Classification Search
USPC .......... 310/43, 45, 194, 201–208, 215, 85, 86
See application file for complete search history.

(56) References Cited

U.S. PATENT DOCUMENTS

| | | | | |
|---|---|---|---|---|
| 5,233,248 A | * | 8/1993 | Kawamura et al. | 310/88 |
| 5,682,074 A | * | 10/1997 | Di Pietro et al. | 310/215 |
| 6,919,662 B2 | * | 7/2005 | Tagome et al. | 310/156.53 |
| 6,998,747 B2 | * | 2/2006 | Kujirai et al. | 310/112 |
| 7,459,817 B2 | * | 12/2008 | VanLuik et al. | 310/89 |
| 7,649,295 B2 | * | 1/2010 | Fukui et al. | 310/215 |
| 2005/0286824 A1 | * | 12/2005 | Garcia | 384/476 |
| 2008/0143114 A1 | * | 6/2008 | Kusase et al. | 290/48 |
| 2009/0200885 A1 | * | 8/2009 | Kikuchi et al. | 310/156.78 |

* cited by examiner

*Primary Examiner* — Dang Le
(74) *Attorney, Agent, or Firm* — Leighton K. Chong

(57) ABSTRACT

A high temperature motor has a stator with poles formed by wire windings, and a rotor with magnetic poles on a rotor shaft positioned coaxially within the stator. The stator and rotor are built up from stacks of magnetic-alloy laminations. The stator windings are made of high temperature magnet wire insulated with a vitreous enamel film, and the wire windings are bonded together with ceramic binder. A thin-walled cylinder is positioned coaxially between the rotor and the stator to prevent debris from the stator windings from reaching the rotor. The stator windings are wound on wire spools made of ceramic, thereby avoiding need for mica insulation and epoxy/adhesive. The stator and rotor are encased in a stator housing with rear and front end caps, and rear and front bearings for the rotor shaft are mounted on external sides of the end caps to keep debris from the motor migrating into the bearings' races.

10 Claims, 9 Drawing Sheets

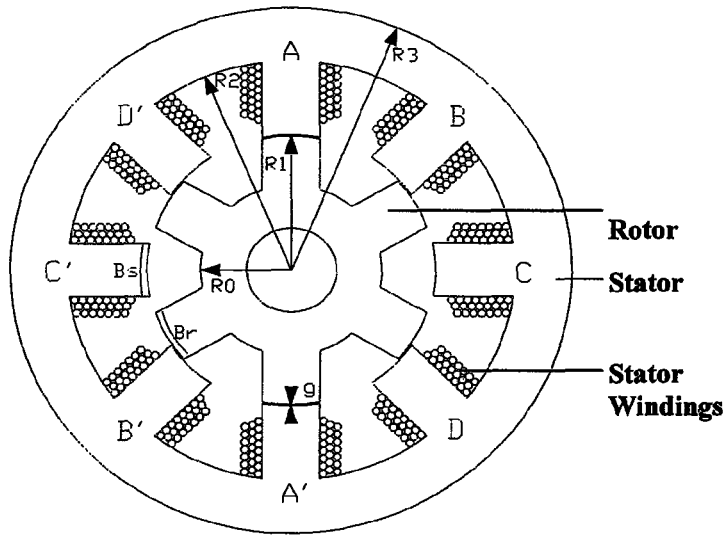
Figure 1: Four-Phase SRM Motor
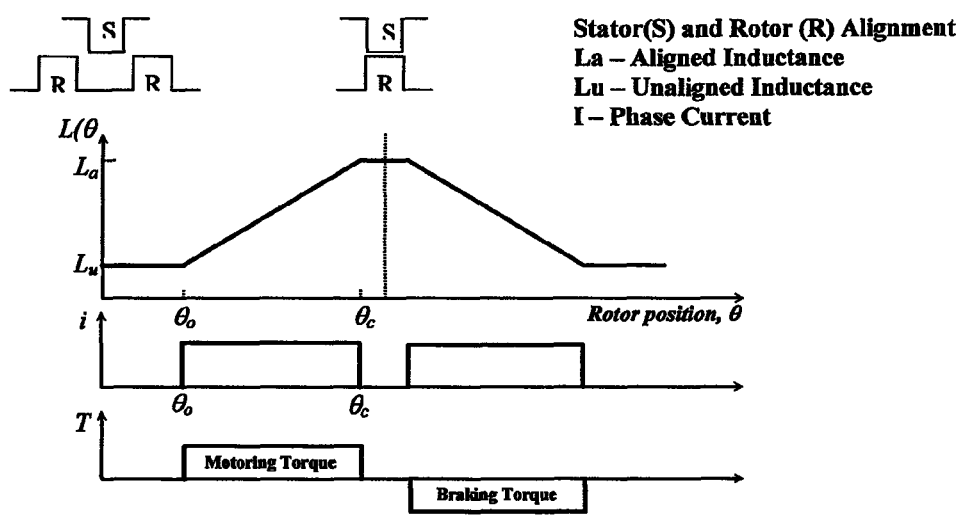
Figure 2: Torque Generation in a SRM

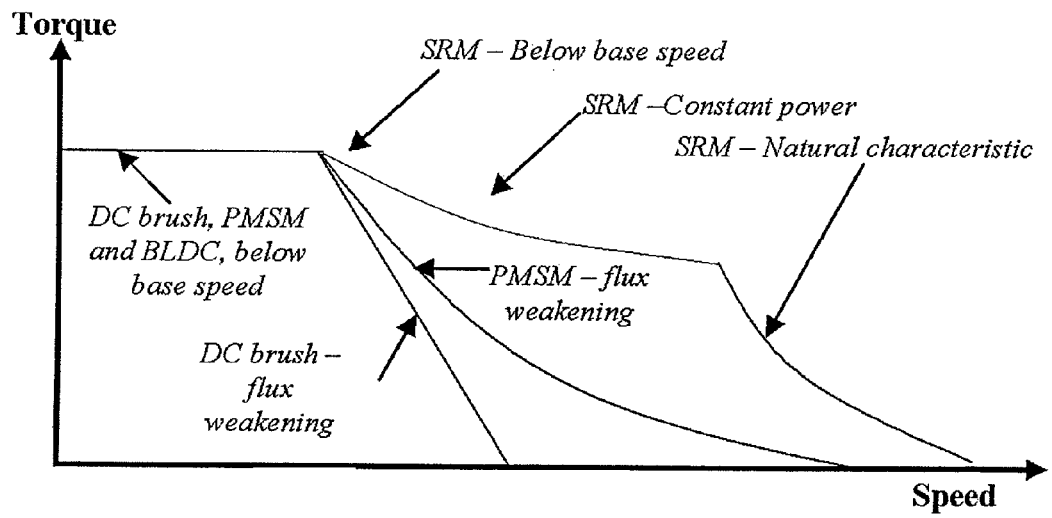
Figure 3: Torque-Speed Characteristics
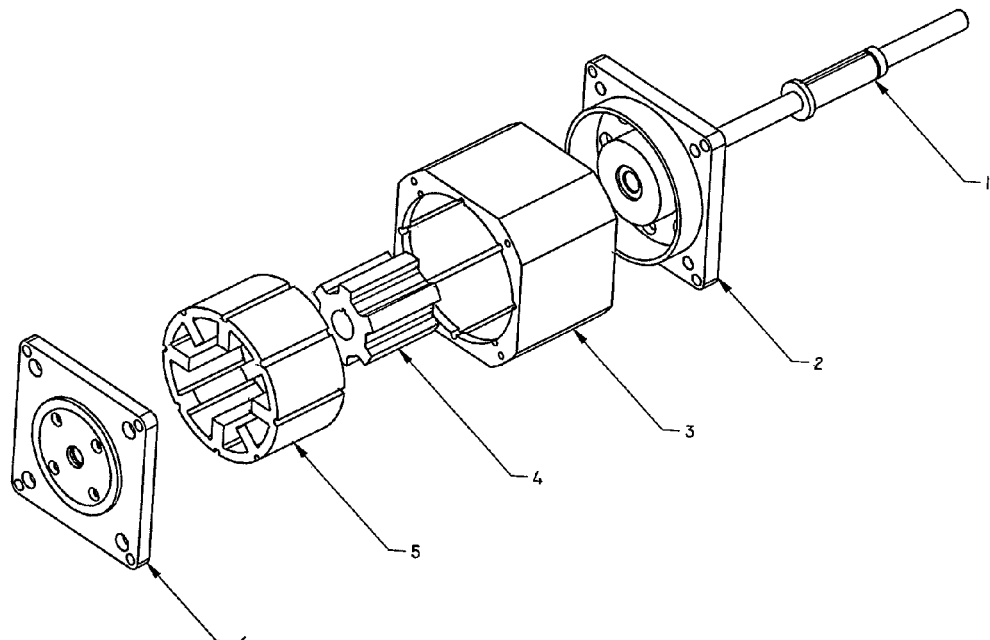
Figure 4: SRM Prototype

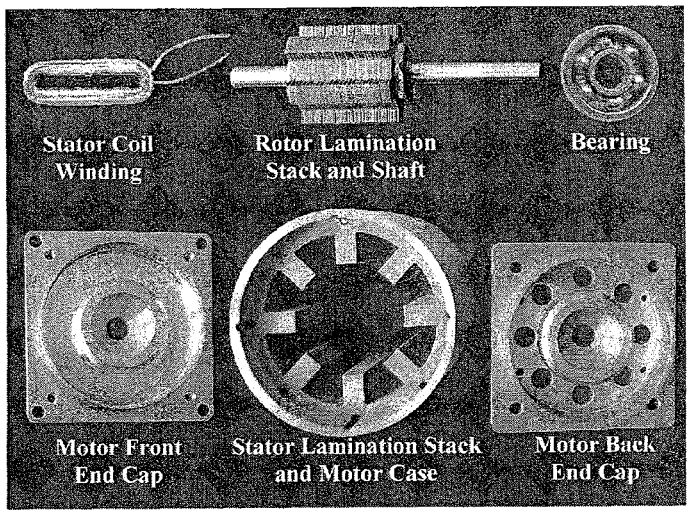 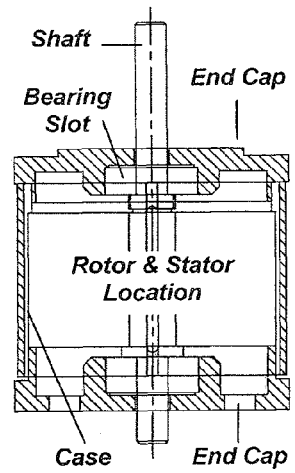
Figure 5A                    Figure 5B
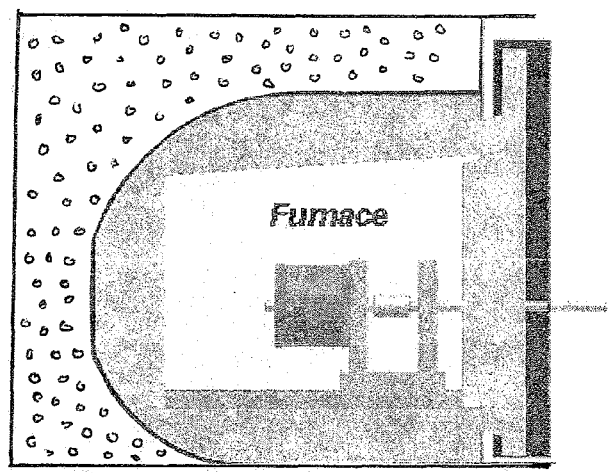
Figure 6

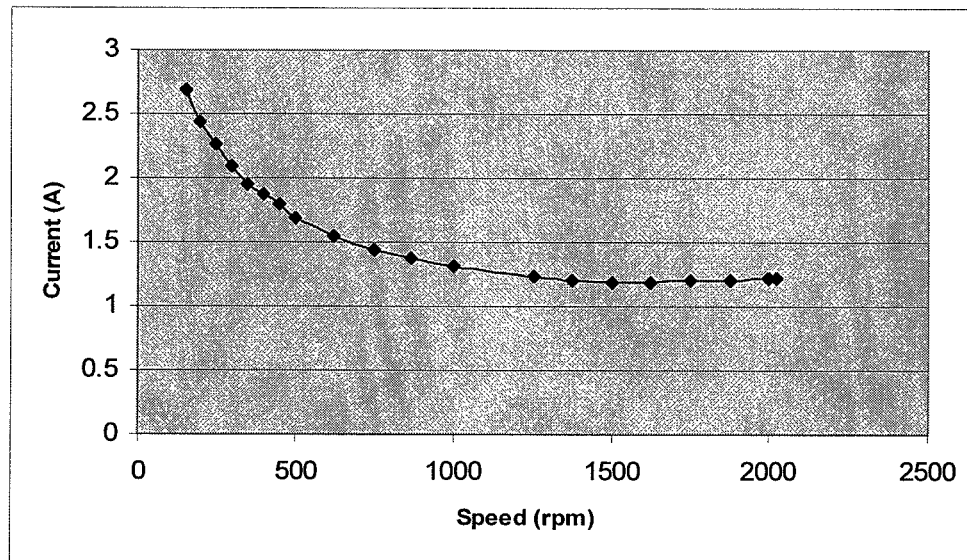
Figure 7: Speed vs. Current 32C 14.2 Volts
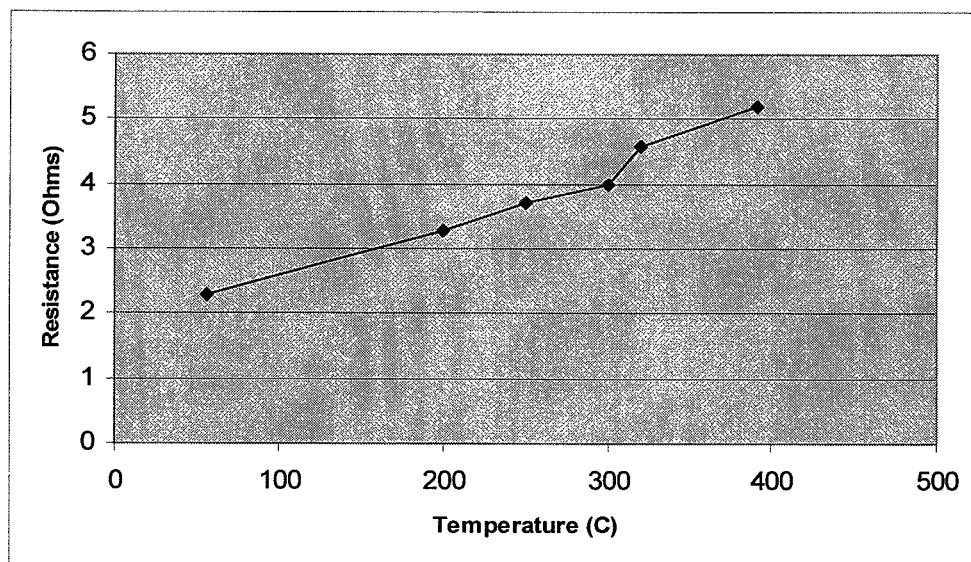
Figure 8: Coil Resistance vs. Temperature

MOTOR FOR HIGH TEMPERATURE APPLICATIONS

This is a continuation-in-part of U.S. patent application Ser. No. 12/255,465 filed on Oct. 21, 2008, now abandoned which claimed the priority of U.S. Provisional Patent Application 60/981,726, filed on Oct. 22, 2007.

This invention was developed with funding under Contract No. NNG05CA55C with NASA, a U.S. Government agency, and the Government retains certain rights therein.

TECHNICAL FIELD

This disclosure is in the field of motors and actuators that can operate in high temperature environments for extended periods of time, and more particularly to high-temperature switched reluctance and BLDC motors.

BACKGROUND

Most existing motors and actuators are not designed to survive in harsh high temperature environments. For example, an extraterrestrial sampling probe to be used in the environment of Venus would need to be operated with motors that can survive in temperatures of 460° C., pressures of 90 bar, and an atmospheric environment of $CO_2$ gas for extended periods of time. There is a need for such high temperature motors in terrestrial applications also, including power plants and industrial processing facilities, as well as turbines, launch vehicles, and furnace system components.

SUMMARY OF INVENTION

A high temperature motor has a stator with poles formed by wire windings, and a rotor with magnetic poles on a rotor shaft positioned coaxially within the stator. The stator and rotor are built up from stacks of magnetic-alloy laminations. The stator windings are made of high temperature magnet wire insulated with a vitreous enamel film, and the wire windings are bonded together with ceramic binder. A thin-walled cylinder is positioned coaxially between the rotor and the stator to prevent debris from the stator windings from reaching the rotor. The stator windings are wound on wire spools made of ceramic, thereby avoiding need for mica insulation and epoxy/adhesive. The stator and rotor are encased in a stator housing with rear and front end caps, and rear and front bearings for the rotor shaft are mounted on external sides of the end caps to keep debris from the motor migrating into the bearings' races.

Preferably, the stator and rotor laminations are made of an iron-cobalt-vanadium alloy selected to have high magnetic saturation, high D.C. maximum permeability, low D.C. coercive force, and low A.C. core loss.

In one embodiment, these materials are integrated on a foundation of a switched reluctance motor (SRM). The SRM is doubly-salient, singly-excited, with salient poles on both the rotor and stator, but only the stator carries windings. The rotor has no windings, magnets, or cage winding. This minimizes the risk that the moving rotor will be susceptible to deterioration or failure while operating under high temperature, high pressure conditions. Both the rotor and the stator are built up from a stack of laminations made of a high temperature rare-earth permanent magnetic alloy. The purpose of the stacked laminations is to reduce eddy current losses during operation. The SRM employs electronic commutation, for which the magnetic field is stepped through the poles physically by sending current pulse sequences to the coils, so that the rotor follows this field.

Preferably, the stator windings are made of a high temperature magnet wire insulated with a fully cured (1400°-1500° F.) vitreous enamel film bonded to the wire conductor. The stator windings are bonded together with an electrically resistant adhesive of ceramic binders to attain a dielectric strength and volume resistivity which can be maintained even when exposed to temperatures up to 2800° F. The stator and rotor laminations are made of an iron-cobalt-vanadium (49% Co-2% V—Fe) magnetic alloy which exhibits high magnetic saturation (24 kilogauss), high D.C. maximum permeability, low D.C. coercive force, and low A.C. core loss. These laminations are stamped from a cold rolled strip and annealed in a protective atmosphere or vacuum environment at high temperature. A full complement bearing is used for the rotor having stellite races and ceramic balls coated with tungsten disulfide.

A motor formed in the above-described manner is found to be capable of operating at 460° C. continuously for long durations.

Furthermore, a brushless DC motor constructed with the same features and materials described above and with a high temperature compatible rare-earth permanent magnet formulation, also performs continuously at 460° C. with some, but not significant, degradation in performance. Similarly, a resolver based on the same construction principles has been shown to perform at 460° C.

Other objects, features, and advantages of the present invention will be explained in the following detailed description of the invention having reference to the appended drawings.

BRIEF DESCRIPTION OF DRAWINGS

FIG. 1 shows a switched reluctance motor (SRM) of doubly-salient, singly-excited type used for a high temperature motor.

FIG. 2 show this principle of torque production based on rotor position.

FIG. 3 shows a torque-speed plot for an SRM in comparison to other motor types typically used in robotic applications.

FIG. 4 shows a prototype of a four-phase SRM motor with an 8-pole stator and a 6-pole rotor used for a high temperature motor.

FIG. 5A shows the prototype SRM motor parts, and FIG. 5B shows a schematic sectional view of the assembled SRM motor.

FIG. 6 shows a setup for testing the motor in a high temperature furnace.

FIG. 7 shows test results for the motor of current versus speed at 34° C.

FIG. 8 shows test results for the motor of coil resistance versus temperature.

DETAILED DESCRIPTION OF INVENTION

Figure 9:
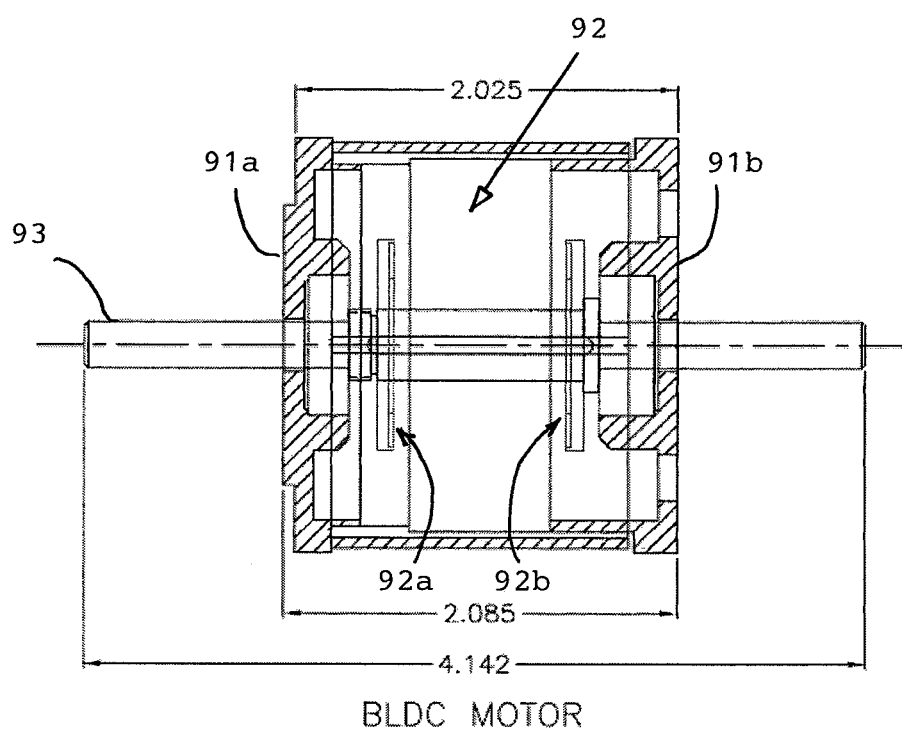
FIG. 9 shows a cross section of an embodiment of a brushless DC motor.

In the following detailed description of the invention, certain preferred embodiments are illustrated providing certain specific details of their implementation. However, it will be recognized by one skilled in the art that many other variations and modifications may be made given the disclosed principles of the invention.

In a preferred embodiment, a switched reluctance motor (SRM) of doubly-salient, singly-excited type is used, with salient poles on both the rotor and stator, but only the stator carries windings, as shown in FIG. 1. The rotor has no windings, magnets, or cage winding. Both the rotor and the stator are built up from a stack of magnetic-alloy, salient-pole laminations. The purpose of the stacked laminations is to reduce eddy current losses during operation. The SRM employs electronic commutation, for which the magnetic field is stepped through the poles physically by sending current pulse sequences to the coils, so that the rotor follows this field. The operating principle of SRMs is based on the tendency of a rotor pole pair to align with the energized stator pole pair. In FIG. 1, the four current phases are listed as A, B, C and D, with A-A', etc., being a pole pair.

SRMs possess unique features that make it a strong competitor against existing A.C. and D.C. motors in various adjustable speed drive applications. It is deemed to be by far the best and potentially only choice for operation under very high temperature, high pressure conditions, such as Venusian surface conditions. The primary advantages of SRMs are the capability to withstand higher temperatures due to the absence of rotor windings and permanent magnets, the simple and low-cost machine construction, and high fault tolerance capability due to the fact that the motor's phases are independent of one another. In the event one or more of the phases fail, the motor will continue to operate, although at a lower torque level. This is an important attribute for flight devices. Another advantage is that the torque-speed characteristics of SRMs can be tailored to the specific application requirements more easily during the design stage than in the case of induction and permanent magnet motors. The starting torque can be very high without the problem of creating excessive inrush current due to its higher self-inductance. The low rotor inertia and high torque/inertia ratio allow fast dynamic response over a very wide operating speed range.

Torque generation in a SRM is derived from the rate of change of co-energy in the motor magnetic circuit as a function of rotor position. A consequence of this principle is that "motoring torque" is generated when the rate of change of inductance is positive and "braking torque" is generated when the rate of change of inductance is negative. FIG. 2 show this principle of torque production based on rotor position.

A typical torque-speed plot for SRMs is shown in FIG. 3, which includes a comparison with other motor types typically used in robotic applications. Aside from the inability of these other types of motors to operate at extreme temperatures, the significant drawbacks of lower power density and higher maintenance requirements, as compared to SRMs, make those motor types non-competitive for extreme environment applications like Venusian surface exploration.

A prototype of a four-phase SRM motor with an 8-pole stator and a 6-pole rotor is shown in FIG. 4. It can be made in small dimensions for sampling probe applications, such as about two inches in diameter and two inches in length. The design is otherwise physically similar to a conventional NEMA 23 stepper motor, which is of relatively small size for space flight applications but large enough so that component integration and assembly time and complexity is minimized.

A most novel aspect of the present embodiment of an extreme environment SRM is its high-temperature component selection, integration and assembly. All components and materials were selected based on the requirement to survive at and above 460° C. for extended durations. The SRM motor parts shown in FIG. 5A, and a schematic sectional view of the assembled SRM motor is shown in FIG. 5B.

The stator windings are made of a high temperature magnet wire selected to have insulation with a fully cured (1400°-1500° F.) vitreous enamel film that is firmly bonded to the wire conductor. An example of a suitable high temperature magnet wire coated with a vitreous enamel film available commercially is #28 AWG Kulgrid HT Wire, which is commercially available from Motion Sensors, Inc., Elizabeth City, N.C. The enamel film has the same flexibility and temperature coefficient as the base wire. It is suitable for coil winding and lead wire applications in aerospace, nuclear, steam, chemical and other high temperature applications. The coating is warranted not to crack when wound on a form 7× diameter of wire. The HT Wire has been successfully used in applications on a continuous basis above 1000° F., with the life expectancy greater than 2500 hours at 1000° F. There is no appreciable degradation from cryogenic to ambient and/or high temperature to ambient cycling. The windings are pre-wound and then slipped over the poles without interfering with each other.

An electrically resistant adhesive to bond the wires together in the stator windings is selected to be made of ceramic binders that have a dielectric strength of 270 volts/mil and a volume resistivity of 10 ohm-cm (at room temp.). An example of a suitable electrically resistant ceramic adhesive is Resbond 919, which is available commercially from Resbond-Cotronics Corporation, Brooklyn, N.Y. The adhesive can maintain its high electrical resistance and dielectric strength even when exposed to temperatures up to 2800° F.

The stator and rotor laminations are selected to be made of a material used in motors and generators for aircraft power generation applications. An example of a suitable high temperature motor lamination material is an iron-cobalt-vanadium (49% Co-2% V—Fe) soft magnetic alloy which exhibits high magnetic saturation (24 kilogauss); high D.C. maximum permeability, low D.C. coercive force, and low A.C. core loss, such as Hiperco® 50 alloy, which is available from Carpenter Technology Corporation, Reading, Pa. The laminations are stamped from a cold rolled strip and must be final annealed in a protective atmosphere or vacuum environment at a high temperature to provide an optimum combination of mechanical and magnetic properties to withstand the high stresses encountered in service. The magnetic properties of Hiperco® 50 alloy have been measured up to temperatures of 800° C. It has been determined that the upper temperature limit for reliable operation of this material is 580° C. Magnetic properties degrade with time at 450° C., but approach stable values after about 1000 hours, which provides the possibility for long-term high temperature operation if the degraded properties are still acceptable for the operation. To improve the magnetic characteristics and/or lower core loss, the annealed laminations are coated with a thin oxide.

A full complement bearing with stellite races and ceramic balls coated with tungsten disulfide is selected for the extreme environment motor. Stellite is a type of nonferrous alloy in which the hardness is an inherent property of the alloy and is not induced by heat treatment. Stellite alloys are very resistant to corrosion and abrasion, and retain their hardness up to 1500° F. (800° C.). Tungsten disulfide solid film lubricants have a service temperature up to 1200° F. (650° C.).

Other material selections for the high temperature, high pressure motor include the motor casing and shaft parts being made of stainless steel, low/mild carbon steel, or titanium. These materials are selected to meet the requirement to perform without degradation at temperatures near 500° C. Also, the motor housing parts are selected so that the coefficients of thermal expansion (CTEs) of the materials are closely matched. This ensures uniform expansion of the parts with temperature, which eliminates stress build-up. Specific grades of materials used are as follows:

Titanium Grade 5 (6AL-4V)—low mass, non-magnetic. Can be heat treated to significantly increase its strength. Melting point is 3000° F. Yield strength is 120,000 psi. Hardness is Rockwell C33.

Stainless Steel Type 303—non-magnetic. Sulfur and phosphorus increase machinability. Low-carbon chromium-nickel (austenitic). Good corrosion, temperature resistance. Maximum corrosion resistance temperature 1600° F.

The control of the extreme environment SRM presents some unique challenges. The prototype motor was tested using an open-loop control method, driving the motor as a stepper, is therefore selected. In stepper control, the magnetic field is "stepped" from coil to coil in sequence. Due to the geometry of the prototype motor (8 stator poles and 6 rotor poles), stepping the stator field clockwise from one opposite pair of poles to the adjacent pair results in a rotor motion of 15° counterclockwise. The motor can be operated at a maximum of 800 steps per second, or 2000 rpm.

Using the open-loop control method, a test setup was devised to test the prototype motor in an extreme environment of a high temperature furnace, as shown in FIG. 6. The furnace is capable of operating at temperatures between 200° C. (392° F.) and 1100° C. (2012° F.). The constant $CO_2$ flow into the chamber provided a decrease in $O_2$ content from about 20% to about 5% by volume. Neither the high pressure nor the density of the atmosphere at the Venusian surface was considered in these tests since they would have no effect on the operation of the motor designed. Pressure would mainly affect the motor electronics. However, during these tests the control board and electronics were kept outside of the thermal chamber and maintained at Earth ambient temperature. This was justified since all current plans for Venus spacecraft systems have all electronics housed inside the temperature- and pressure-controlled landed vessel. Also, the high gas density would only affect thermal convection rates but since the motor is being designed to operate at 460° C. and higher, heat transfer is not an issue.

The motor output shaft is rigidly coupled to a rod that extends through the furnace door to the ambient environment and (the other end of the rod) is coupled to a dynamometer that measures and applies torque loads. The extension rod is supported at its ends by high temperature bearings. The door of the furnace has been modified to allow the rotating motor shaft extension rod, motor wires, a thermocouple, and $CO_2$ gas to be passed through the door insulation and frame. Again, the motor control board remained outside of the chamber.

No Load Test

The prototype motor was tested with no-load at room temperature. Powered by fixed voltage, the motor was operated at different speeds to obtain the motor current information. At 14.2 V, the motor current decreased as the motor speed increased, and stabilized around 1500 rpm. The measured results for current versus speed at 34° C. are shown in FIG. 7.

The motor was also tested with no-load at different temperatures to verify the temperature effect on the motor. As the temperature rises, coil resistance is found to increase with temperature to almost three times the resistance at room temperature when running at 460° C. The measured results for coil resistance versus temperature are shown in FIG. 8.

The motor was also tested for a fixed power voltage. The motor "no-load" current is found to decrease with temperature because of the resistance increase. The prototype tests showed that the motor functioned successfully at 460° C. for extended periods of time. A second prototype of this motor was used to actuate a drilling system which was also successfully tested at 460° C.

As another embodiment, a prototype PM BLDC motor was also constructed using the same manufacturing techniques and methods used for the SRM. The prototype motor had 3 phases, 6 slots and a 4 pole configuration interior-rotor. The stator is similar to that of the three-phase induction motor and carries the windings, and the magnets are on the rotor. The rotor and the stator are built up from a stack of magnetic-alloy laminations. The stator windings are made of high temperature magnet wire insulated with a vitreous enamel film bonded to the magnet wire, and the windings are bonded together with an electrically resistant adhesive made of a ceramic binder.

A cross section of the prototype brushless DC motor is shown in FIG. 9, having spaced-part opposing stator faces 91a, 91b and interior rotor 92 with outer faces 92a, 92b facing the corresponding stator halves, respectively, mounted on shaft 93. It is approximately 2 inches in diameter×2 inches long with a 4 inches long shaft (shaft length was deliberately oversized to allow coupling with an output shaft and a resolver). All components in the motor were rated for continuous operation at 460° C.

In order to commutate the PM BLDC motor (and to enable position control) in a high temperature environment, a brushless resolver was also developed. The resolver provides very fine resolution in the shaft position signal. Its output is a two-phase (sine/cosine) signal at the carrier frequency, modulated sinusoidally by the rotation of the rotor past the stator. The resolver is an absolute position transducer because it provides a signal at any position and any speed, including zero speed. The direction of rotation can be determined from the relative phase between the two channels. Typically, the resolver rotor mounts on a shaft extension of the brushless DC motor at the non-drive end.

Figure 10:
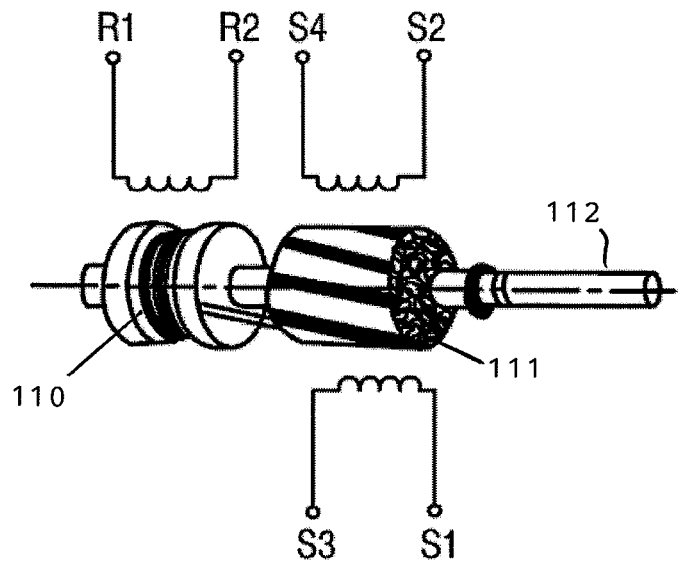
FIG. 10 shows a schematic of a resolver for a brushless DC motor.

As a further embodiment, the resolver's construction is very similar to a motor's, that is, one end has terminal wires, and the other end has a mounting flange and a shaft. Internally there is a rotor and stator. A "signal" or reference winding revolves inside a fixed stator. The output of the signal changes as the winding is moved (the rotor). This changing signal is directly proportional to the angle which the rotor has moved through. A schematic view of a simple brushless resolver, shown in FIG. 10, contains a single input winding with terminals R1-R2, and two output windings with terminals S1-S3 and S2-S4 (located 90 degrees apart). The windings are made of high temperature magnet wire insulated with a vitreous enamel film bonded to the magnet wire, and the windings are bonded together with an electrically resistant adhesive made of a ceramic binder. The brushless aspect of the design is accomplished by using a rotary transformer to power the signal or reference windings. When a reference signal is applied to the input or primary transformer winding on the stator, transformer action induces a voltage in the secondary winding 110 which is physically mounted on the rotor shaft 112. This voltage is then supplied to the reference or signal windings 111 also located on the rotor shaft 112. As the rotor shaft 112 is moved, the signal is modified according to, and proportional to, the angle the resolver rotor is moved through. The flow of current in the signal windings on the rotor proportionally induces sine and cosine signal voltages in the two output stator coils indicated as S1-S3 and S2-S4. These signals are then fed into the controller.

Figure 11:
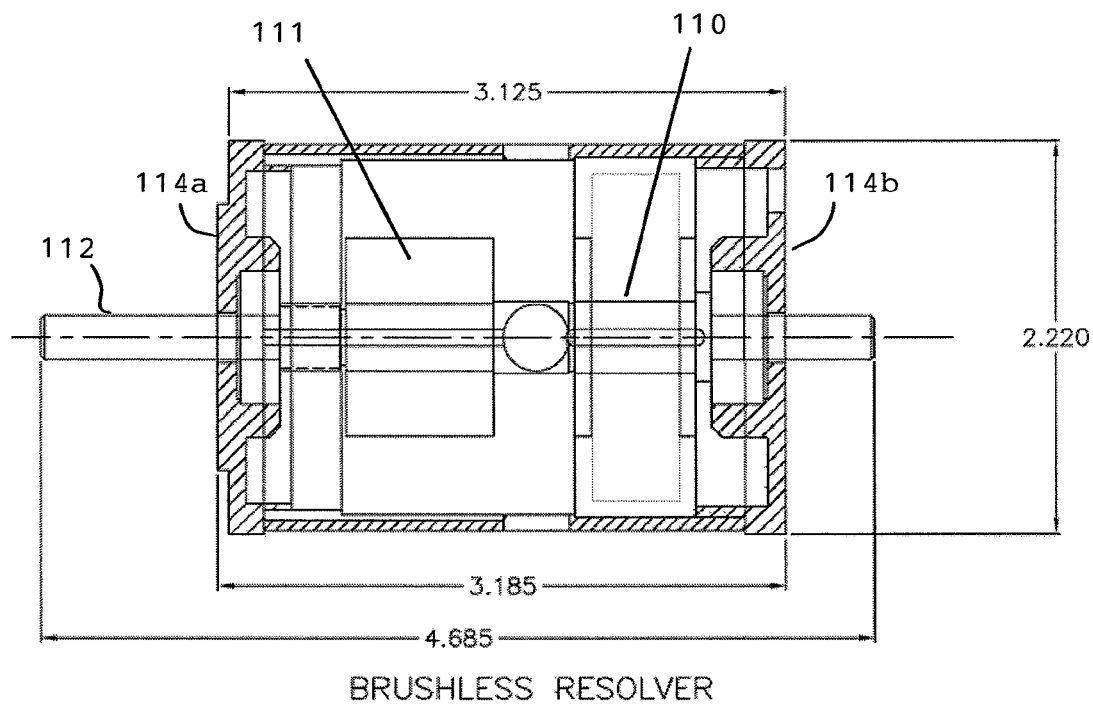
FIG. 11 shows a cross section of an embodiment of the resolver.

A cross section of the prototype resolver is shown in FIG. 11, having spaced-part opposing stator faces 114a, 114b and secondary transformer winding 110 and signal windings 111 mounted on rotor shaft 112. It is approximately 2 inches in diameter×2.5 inches long with 4.7 inches shaft length. The resolver was coupled to the BLDC motor via a shaft coupling. Like the BLDC and SRM motors, all components in the resolver are rated for continuous operation at 460° C.

Further details of a unique assembly structure for the high temperature motor construction will now be described. The assembly structure is designed to solve problems in the prior art which have some deficiencies. Specifically, it was found that the inorganic based epoxies/adhesives used to hold the ceramic coated wire in a shape formed to enable its installation into the stator is quite brittle. The mica material used to insulate the wire from the metallic structure of the stator is quite brittle as well. In a vibration heavy environment, e.g., as experienced during a rocket launch or on airplanes, the brittleness of the two types of insulation can result in its flaking and falling off. Both of these can have detrimental effects on the motor and its reliability for critical space and aerospace applications. The loss of insulation presents two problems, these are: (1) it creates the potential for an electrical short between the coil and the motor housing and (2) migration of insulation flakes (debris) to the motor's bearings and/or between the motor's stator-rotor air gap can result in, at worse, the complete seizure of the bearings and therefore complete loss of the motor's ability to function and/or, at minimum, a reduction of the available torque from the motor.

Figure 12:
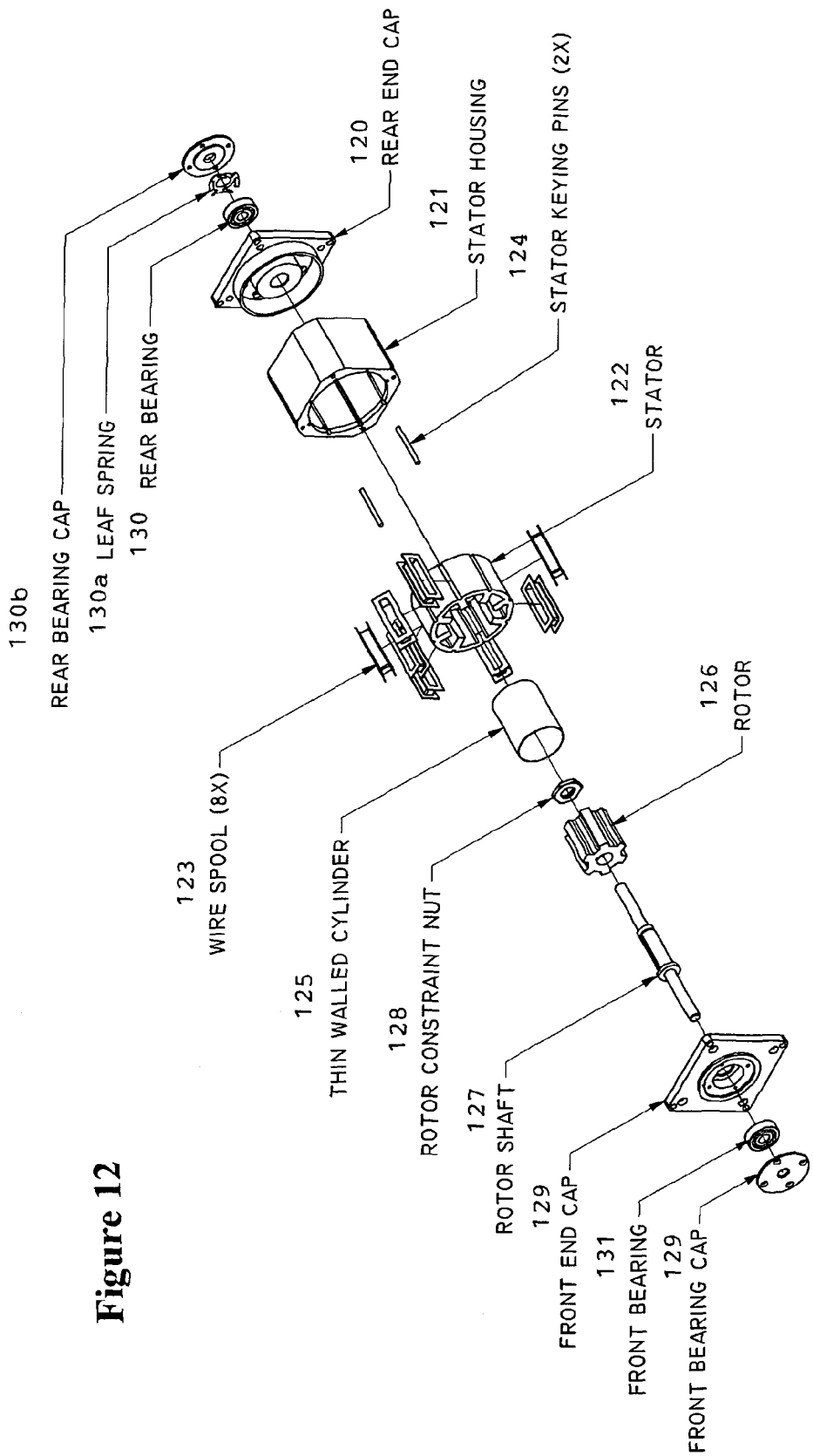
FIG. 12 shows an exploded view of a unique assembly structure of the high temperature motor.

The unique assembly structure in the present invention overcomes these potential problems. FIG. 12 shows an exploded view of the unique assembly structure of the present invention for a switched reluctance motor. Encased between a rear end cap 120 and a front end cap 129 are a stator housing 121, a stator 122 in a cylindrical form with pole slots formed on its inner circumference for holding respective wound wire spools 123 therein, the stator 122 being held stationary in position in the stator housing 121 by stator keying pins 124, a thin walled cylinder 125 inserted coaxially within the inner core of the stator dividing it from the rotor, and a rotor 126 on a solid rotor shaft 127 held by a rotor constraint nut 128 and disposed within the thin-walled cylinder 125. Rear bearing 130 for the rear end of the rotor shaft is held by leaf spring 130a and retainer 130b on the external side of the rear end cap 120, and front bearing 131 for the front end of the rotor shaft is held by retainer 131a on the external side of the front end cap. There are 8 poles on the stator 122 and thus, 8 wire spools 123 for the windings. The wire spools 123 may be held in place in their slots in the stator 122 mechanically by the thin-walled cylinder, and/or by a feature on the end caps that engages them (if the cylinder is not used) and/or by radially acting "finger" or cantilever springs that are machined as one part. If the thin-walled cylinder is used, then the spools may also be held in place on the stator by an inorganic epoxy/adhesive.

Figure 13:
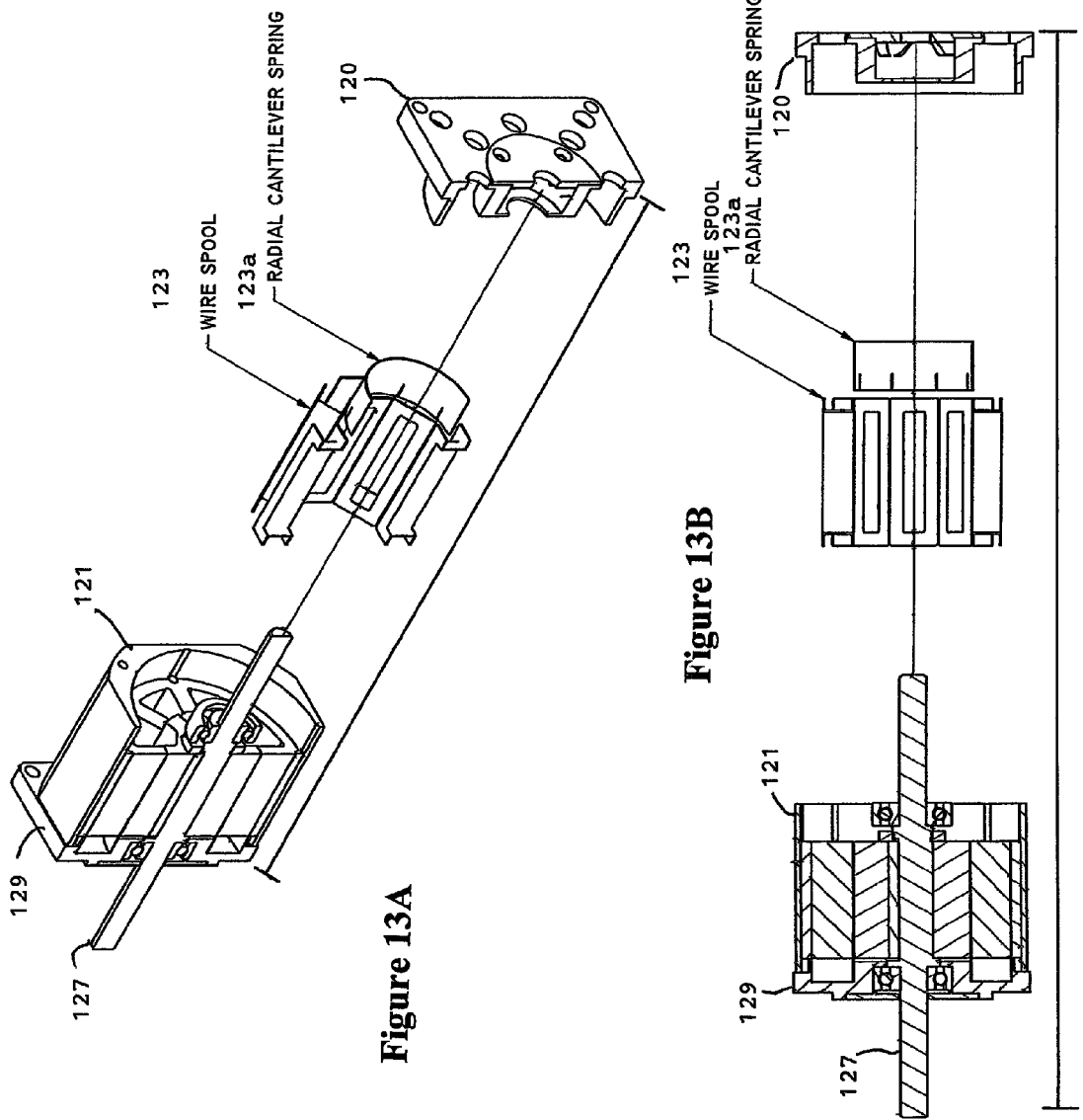
FIGS. 13a and 13b are assembly views in perspective and in cross-section of an alternate embodiment for assembly of the high temperature motor shown in FIG. 12.

FIGS. 13a and 13b are assembly views in perspective and in cross-section of an alternate embodiment for assembly of the high temperature motor shown in FIG. 12. Instead of the thin-walled cylinder, the wire spools for the stator windings are held in place by the cantilever spring member 123a. It provides a purely mechanical means of securing the windings to the stator that does not rely on an epoxy which has the problems cited in the prior art. When this retention scheme is used (meaning that there is no epoxy used in the system), it negates the need for the thin-walled cylinder and may be an important option in certain applications.

Figure 14:
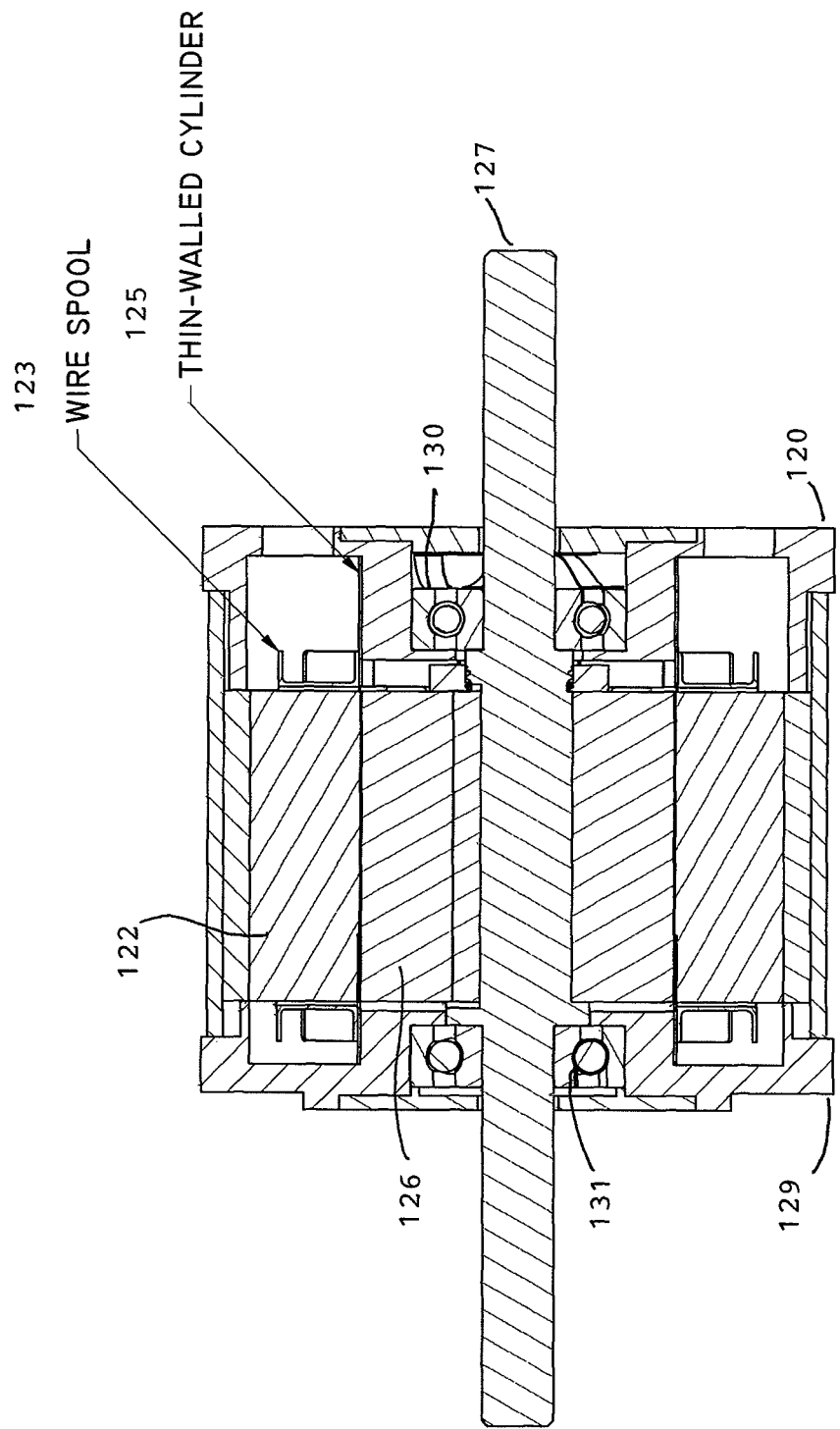
FIG. 14 is a cross-sectional view of the motor assembly.

FIG. 14 is a cross-sectional view of the motor assembly showing the location of the thin-walled cylinder, its engagement with the end caps and the location of the bearings and wire spools. This figure also shows the compartmentalization or separation of the windings on the stator from the rotor. The material for the thin-walled cylinder should be non-magnetic (e.g., titanium) with a CTE that matches that of the stator's laminations. The cylinder may be formed with a tight fit to hold the spools on the stator, and an air gap may be maintained by the bearings on the rotor such that there is no possible contact with the cylinder. The fit between the thin-walled cylinder and the end caps is a sliding one such that there should be pressure equalization inside the motor. Furthermore, where the winding leads exit, the motor can have air passages to equalize the ambient pressure between stator and rotor.

Particularly preferred for the unique assembly structure for the high temperature motor construction is that the wire spools 123 are manufactured from an inorganic material, e.g., a ceramic, to contain the motor's windings. MACOR is an example of one such ceramic material. The coils of the windings will be wound directly onto the spool and then inserted, as an assembly, onto the stator's poles. In this manner, the need for mica insulation between the coil and the stator is eliminated and furthermore, the need for the inorganic epoxy/adhesive in between layers of the coils is also eliminated.

A second aspect to eliminating the potential problems of the prior art relies on containing the flake debris. In this case, the thin-walled cylinder 125 is inserted between the rotor 126 and stator 122, such that when the end caps 120, 129 of the motor are installed, the stator's windings are effectively isolated from the rotor. A very close sliding fit between the mating feature on the end caps and the internal diameter of the thin-walled cylinder effectively provides a seal that prevents movement of debris to the air gap between the stator and rotor. Grooves may be cut along the circumference of the end caps' mating feature to allow the accumulation of any debris. However, any debris that moves past the seal described above will be very small and will not pose a problem for the motor's operation.

High temperature bearings with shields and/or seals are almost non-existent. Therefore implementation of the design features described above are critical to building a reliable high temperature motor as the debris is very likely to migrate towards the motor's bearings and air gap. To further enhance the motor's reliability, the unique assembly structure of the present invention locates the bearings 130, 131 on the outboard side of the motor's end caps 120, 129, thereby reducing the possibility of debris from the stator and rotor migrating into the bearings' races.

The features of the invention described above can be implemented separately or as any combination of two or more.

It is understood that many modifications and variations may be devised given the above description of the principles of the invention. It is intended that all such modifications and variations be considered as within the spirit and scope of this invention, as defined in the following claims.

The invention claimed is:
1. A high temperature motor comprising:
a stator in a cylindrical shape on a motor axis having poles formed by wire windings on an inner circumference thereof, said wire windings being wound on respective wire spools held in place in respective slots formed on the inner circumference of said stator;

a rotor mounted on a rotor shaft having poles formed by magnetic material and being positioned coaxially within an inner volume defined in said stator;

a thin-walled cylinder positioned coaxially between said rotor and said stator for physically separating them, wherein said stator and said rotor are built up from a stack of magnetic-alloy laminations, and wherein said stator wire windings are made of a high temperature magnet wire insulated with a vitreous enamel film bonded to the magnet wire, and the wire windings are bonded together with an electrically resistant adhesive made of a ceramic binder, and wherein said rotor is separated from the wire windings in said stator by said thin-walled cylinder, thereby preventing debris from the stator windings from reaching the rotor, wherein said motor is configured as a resolver, having an interior resolver rotor that carries laminations and windings for providing signal feedback information, said resolver rotor being mountable to a shaft extension of a brushless DC motor at a non-drive end thereof and providing an output signal that is directly proportional to an angle through which the resolver rotor moves, wherein the resolver rotor and stator are built up from a stack of magnetic-alloy laminations, wherein the resolver stator and rotor windings are made of a high temperature magnet wire insulated with a vitreous enamel film bonded to the magnet wire, and the windings are bonded together with an electrically resistant adhesive made of a ceramic binder.

2. A high temperature motor according to claim 1, wherein the wire spools are manufactured from a ceramic material, and when wound with wire windings are inserted into the slots defining the stator's poles, thereby avoiding need for mica insulation and epoxy/adhesive between layers of windings.

3. A high temperature motor according to claim 1, wherein said stator and said rotor are contained in a stator housing encased by a rear end cap and a front end cap, and a rear bearing for a rear end of the rotor shaft is mounted on an external side of the rear end cap, and a front bearing for a front end of the rotor shaft is mounted on an opposite external side of the front end cap, thereby reducing the possibility of debris from the stator and rotor migrating into the bearings' races.

4. A high temperature motor according to claim 1, wherein said stator windings are made from high temperature magnet wire insulated with a vitreous enamel film fully cured at 1400°-1500° F.

5. A high temperature motor according to claim 1, wherein said ceramic binder adhesive is selected to have properties of dielectric strength in the range of 270 volts/mil and volume resistivity of 10 ohm-cm at room temperature, and can maintain its high electrical resistance and dielectric strength even when exposed to very high temperatures.

6. A high temperature motor according to claim 1, wherein said laminations are stamped from a cold rolled strip of a 49% Co-2% V-Fe soft magnetic alloy and final annealed in a protective atmosphere or vacuum environment at high temperature.

7. A high temperature motor according to claim 1, wherein said magnetic alloy for said laminations is selected to have properties of a high magnetic saturation in the range of 24 kilogauss, high D.C. maximum permeability, low D.C. coercive force, and low A.C. core loss.

8. A high temperature motor according to claim 1, further comprising bearings for the rotor having stellite races and ceramic balls coated with tungsten disulfide.

9. A high temperature motor according to claim 1, wherein the high temperature magnet wire insulated with vitreous enamel film bonded together with adhesive ceramic binder of said stator windings, and the high temperature rare-earth permanent magnetic alloy of said stator and rotor laminations are selected and integrated together so that said motor can operate at least about 460° C. continuously for long durations.

10. A high temperature motor according to claim 1, wherein the high temperature magnet wire insulated with vitreous enamel film is bonded together with the adhesive ceramic binder of said stator windings, and said stator and rotor laminations are made of high temperature rare-earth permanent magnetic alloy selected and integrated together so that said resolver can operate at least about 460° C. continuously for long durations.

* * * * *